United States Patent
Fainor et al.

(10) Patent No.: US 10,121,138 B2
(45) Date of Patent: Nov. 6, 2018

(54) CORRECTABLE PRE-PAYMENT FOR DATABASE SERVICES

(71) Applicant: International Business Machines Corporation, Armonk, NY (US)

(72) Inventors: Judith A. Fainor, Doylestown, PA (US); David J Henderson, Newtown, PA (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 13/733,490

(22) Filed: Jan. 3, 2013

(65) Prior Publication Data
US 2014/0188706 A1 Jul. 3, 2014

(51) Int. Cl.
*G06Q 20/28* (2012.01)
*G06Q 20/20* (2012.01)
*G06Q 40/02* (2012.01)
*G06Q 20/10* (2012.01)
*G06Q 20/12* (2012.01)
*G06Q 20/40* (2012.01)

(52) U.S. Cl.
CPC ............ *G06Q 20/28* (2013.01); *G06Q 20/10* (2013.01); *G06Q 20/12* (2013.01); *G06Q 20/204* (2013.01); *G06Q 20/407* (2013.01); *G06Q 40/025* (2013.01)

(58) Field of Classification Search
CPC ..... G06Q 20/10; G06Q 20/204; G06Q 40/025
USPC .......................................................... 705/39
See application file for complete search history.

(56) References Cited

U.S. PATENT DOCUMENTS

| 5,274,644 | A | | 12/1993 | Berger et al. |
| 5,499,340 | A | | 3/1996 | Barritz |
| 5,799,287 | A | * | 8/1998 | Dembo .................. 705/36 R |
| 7,421,413 | B2 | | 9/2008 | Frank et al. |

(Continued)

FOREIGN PATENT DOCUMENTS

| CN | 1466368 A | 1/2004 |
| CN | 103914512 A | 7/2014 |

OTHER PUBLICATIONS

Price, Marc, "The Evolution of Transactional Intelligence", 2008, Openet.com (Year: 2008).*

(Continued)

*Primary Examiner* — Eric T Wong
*Assistant Examiner* — Kevin T Poe
(74) *Attorney, Agent, or Firm* — Andrew Aubert; David B. Woycechowsky

(57) ABSTRACT

A method, system and software for managing data services provided by a data services providing entity to a data services customer. The method involves: (i) decrementing relative value units (RVUs) from a data services customer's pre-paid account corresponding to the erroneous use of the data services made by the data services customer; (ii) receiving, from the data services customer, a request for a return of the RVUs decremented at the decrementing step; and (iii) returning the RVUs on condition that the request has been determined to be appropriate. At least the returning step is performed automatically under the control of software provided by the data services providing entity and substantially without human intervention by any human representatives of the data services providing entity.

13 Claims, 7 Drawing Sheets

(56) References Cited

U.S. PATENT DOCUMENTS

| | | | |
|---|---|---|---|
| 7,600,674 B1* | 10/2009 | Marah et al. | 235/380 |
| 7,694,082 B2 | 4/2010 | Golding et al. | |
| 8,024,270 B2 | 9/2011 | I'Anson | |
| 8,584,257 B2* | 11/2013 | Kortum et al. | 726/28 |
| 2002/0083003 A1 | 6/2002 | Halliday et al. | |
| 2002/0172331 A1* | 11/2002 | Barker | 379/67.1 |
| 2002/0173977 A1 | 11/2002 | Dutta | |
| 2004/0019519 A1* | 1/2004 | Tani et al. | 705/10 |
| 2004/0077332 A1* | 4/2004 | Ephraim | H04W 4/24 455/405 |
| 2006/0037083 A1* | 2/2006 | Kortum et al. | 726/28 |
| 2007/0074174 A1 | 3/2007 | Thornton | |
| 2007/0124237 A1* | 5/2007 | Sundararajan et al. | 705/38 |
| 2008/0177673 A1* | 7/2008 | Ahn et al. | 705/36 R |
| 2008/0293386 A1* | 11/2008 | Noldus | H04M 15/00 455/414.1 |
| 2010/0049666 A1* | 2/2010 | Tyler | 705/36 R |
| 2010/0131649 A1 | 5/2010 | Ferris | |
| 2011/0211465 A1* | 9/2011 | Farrugia | H04L 12/14 370/252 |
| 2011/0213732 A1* | 9/2011 | Maounis | 705/36 R |
| 2012/0036051 A1 | 2/2012 | Sachson | |
| 2012/0116937 A1 | 5/2012 | Van Biljon et al. | |
| 2012/0231785 A1* | 9/2012 | Poon | H04W 24/04 455/423 |
| 2012/0233050 A1* | 9/2012 | Sheldon | 705/37 |
| 2012/0271660 A1* | 10/2012 | Harris | G06Q 30/016 705/4 |
| 2012/0327787 A1* | 12/2012 | Mohammed | H04W 24/08 370/242 |
| 2014/0040091 A1* | 2/2014 | Phelan et al. | 705/37 |
| 2014/0067713 A1* | 3/2014 | Gerber | 705/36 R |

OTHER PUBLICATIONS

Dudani, Hiro, "Virtual Private Networks for Peer-to-Peer Infrastructures", Nov. 30, 2012 (Year: 2012).*

Chan et al., "Distributed and Dynamic Mobility Management in Mobile Internet", Feb. 2011, Journal of Communications, vol. 6 (Year: 2011).*

IBM, "InfoSphere Optim Data Lifecycle Management Solutions," date printed Oct. 17, 2012 <http://www-01.ibm.com/software/data/optim/>.

IBM, "InfoSphere Optim Enterprise Edition V9.1 and Workgroup Edition V9.1 offer simplified packaging with capability-based pricing," IBM United States Software Announcement 212-331, dated Oct. 2, 2012, pp. 1-27.

* cited by examiner

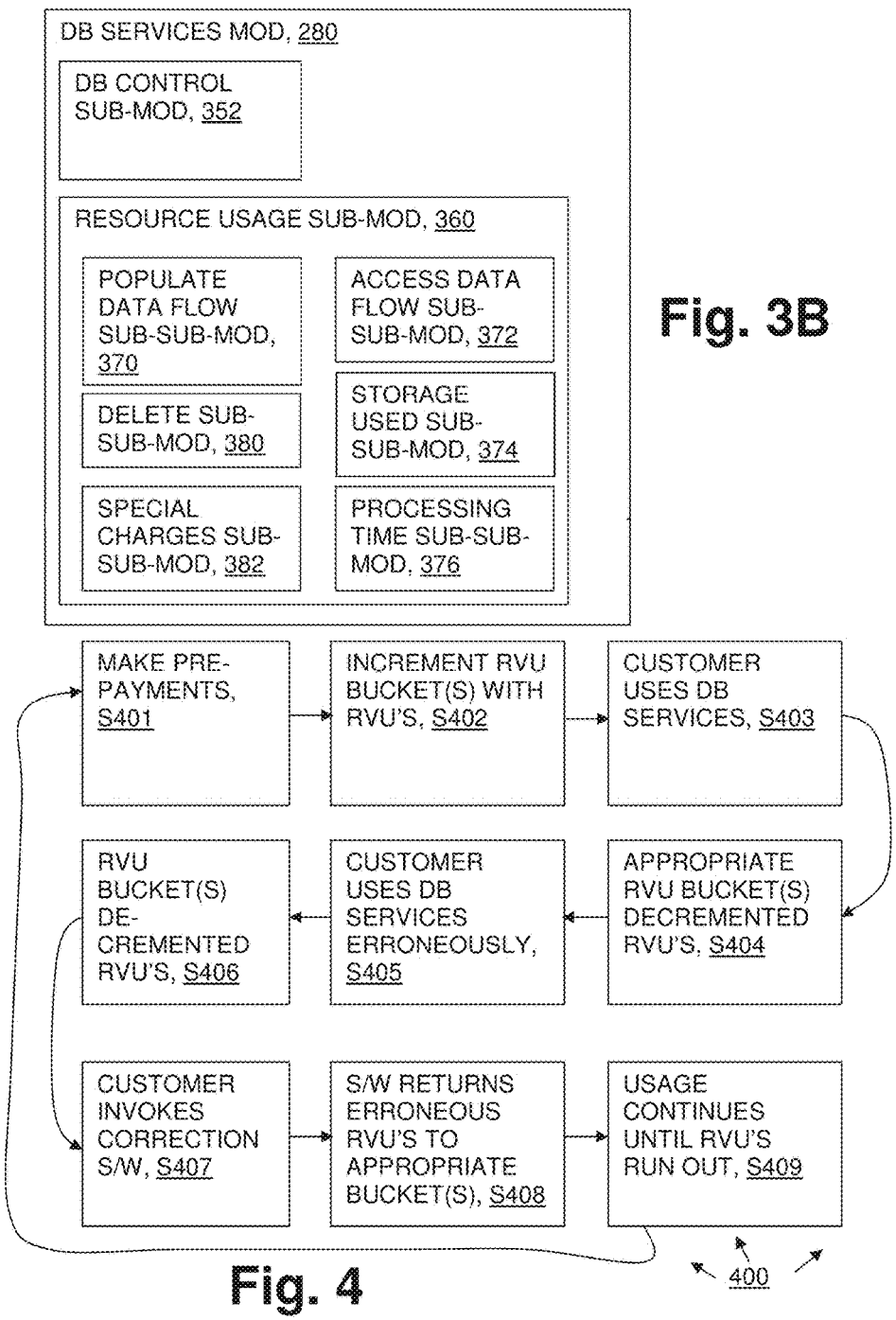

| CTR_ID | Capacity Type | Capacity Token | Return Token | Purchased Capacity | Used Capacity | Avail Capacity | Create Date | Modify Date | Create User | Modify User | CTR Data |
|---|---|---|---|---|---|---|---|---|---|---|---|
| 100 | 2 | 0F0E0D0C | | 200 | | 185 | 2/22/2012 | | JudyF | | Purchased 200 GB for TDM |
| 300 | 2 | 0F0E0D0C | 0F0E0D1C | | 2.5 | | 2/23/2012 | | ToddN | | IBM.EXTRACT1 |
| 302 | 2 | 0F0E0D0C | 0F0E0D1C | | 0.5 | | 2/23/2012 | | | | dc92.judyf.cust omers |
| 302 | 2 | 0F0E0D0C | 0F0E0D1C | | 2 | | 2/23/2012 | | | | dc92.judyf.order s |
| 300 | 2 | 0F0E0D0C | 0F0E0D2C | | 2.5 | | 2/24/2012 | | ToddN | | IBM.EXTRACT2 |
| 302 | 2 | 0F0E0D0C | 0F0E0D2C | | 1 | | 2/23/2012 | | | | dc92.judyf.cust omers |
| 302 | 2 | 0F0E0D0C | 0F0E0D2C | | 1.5 | | 2/23/2012 | | | | dc92.judyf.order s |
| 300 | 2 | 0F0E0D0C | 0F0E0D3C | | 15 | | 2/23/2012 | | ToddN | | IBM.EXTRACT3 |
| 302 | 2 | 0F0E0D0C | 0F0E0D3C | | 10 | | | | | | dc92.judyf.cust omers |
| 302 | 2 | 0F0E0D0C | 0F0E0D3C | | 5 | | | | | | dc92.judyf.order s |
| 301 | 2 | 0F0E0D0C | | | 10 | | 2/23/2012 | | | | dc92.judyf.cust omers |
| 301 | 2 | 0F0E0D0C | | | 5 | | 2/23/2012 | | | | dc92.judyf.order s |

*Fig. 6A*

| CTR_ID | Capacity Type | Capacity Token | Return Token | Purchased Capacity | Used Capacity | Avail Capacity | Create Date | Modify Date | Create User | Modify User | CTR Data |
|---|---|---|---|---|---|---|---|---|---|---|---|
| 100 | 2 | 0F0E0D0C | | 200 | | 197 | 2/22/2012 | | JudyF | | Purchased 200 GB for TDM |
| 300 | 2 | 0F0E0D0C | 0F0E0D1C | | 2.5 | | 2/23/2012 | | ToddN | | IBM.EXTRACT1 db2.judyf.cust omers |
| 302 | 2 | 0F0E0D0C | 0F0E0D1C | | 0.5 | | 2/23/2012 | | | | do92.judyf.order s |
| 302 | 2 | 0F0E0D0C | 0F0E0D1C | | 2 | | 2/23/2012 | | | | do92.judyf.order s |
| 300 | 2 | 0F0E0D0C | 0F0E0D2C | | 2.5 | | 2/24/2012 | | ToddN | | IBM.EXTRACT2 db2.judyf.cust omers |
| 302 | 2 | 0F0E0D0C | 0F0E0D2C | | 1 | | | | | | do92.judyf.order s |
| 302 | 2 | 0F0E0D0C | 0F0E0D2C | | 1.5 | | | | | | do92.judyf.order s |
| 300 | 2 | 0F0E0D0C | 0F0E0D3C | | 5 | 15 | 2/24/2012 | 2/26/2012 | ToddN | ToddN | IBM.EXTRACT3 |
| 301 | 2 | 0F0E0D0C | | | 1 | | 2/23/2012 | | | | do92.judyf.cust omers |
| 301 | 2 | 0F0E0D0C | | | 2 | | 2/23/2012 | | | | do92.judyf.order s |

Fig. 6B

| CTR_ID | Capacity Type | Capacity Token | Return Token | Purchased Capacity | Used Capacity | Avail Capacity | Create Date | Modify Date | Create User | Modify User | CTR Data |
|---|---|---|---|---|---|---|---|---|---|---|---|
| 100 | 2 | 0F0E0D0C | | 200 | | 197.5 | 2/22/2012 | | JudyF | | Purchased 200 GB for TDM |
| 300 | 2 | 0F0E0D0C | 0F0E0D1C | | 2.5 | | 2/23/2012 | | ToddN | | IBM EXTRACT1 |
| 302 | 2 | 0F0E0D0C | 0F0E0D1C | | 0.5 | | 2/23/2012 | | | | do92.judyf.cust omers |
| 302 | 2 | 0F0E0D0C | 0F0E0D1C | | 2 | | 2/23/2012 | | | | do92.judyf.order s |
| 300 | 2 | 0F0E0D0C | 0F0E0D2C | | 2.5 | 2.5 | 2/24/2012 | 2/25/2012 | ToddN | ToddN | IBM EXTRACT2 |
| 300 | 2 | 0F0E0D0C | 0F0E0D3C | | 15 | 15 | 2/24/2012 | 2/25/2012 | ToddN | ToddN | IBM EXTRACT3 |
| 301 | 2 | 0F0E0D0C | | | 0.5 | | 2/23/2012 | | | | do92.judyf.cust omers |
| 301 | 2 | 0F0E0D0C | | | 2 | | 2/23/2012 | | | | do92.judyf.order s |

*Fig. 6C*

CORRECTABLE PRE-PAYMENT FOR DATABASE SERVICES

FIELD OF THE INVENTION

The present invention relates generally to the field of computerized database services (such as business database archiving and business database archive management), and more particularly to pre-paid computerized database services.

BACKGROUND OF THE INVENTION

Computerized database services, such as business database archiving and business database archive management are known. For example, a commercially available system that includes such computerized database services is currently sold by IBM Corporation under the following name: IBM InfoSphere Optim Enterprise Edition V9.1 and Workgroup Edition V9.1 offer simplified packaging with capacity-based pricing. This package of software and/or services has been described as follows: "InfoSphere® Optim™ Enterprise Edition V9.1 and Workgroup Edition V9.1 offer simplified packaging with capacity-based pricing for Optim's Archive, Test Data Management, and Data Privacy capabilities." At least some database services systems can manage data from requirements to retirement to promote business driven governance. Preferably, database services: (i) reduce risk and costs, (ii) speed solution delivery, (iii) boost performance and (iv) address compliance requirements for databases, warehouses and big data environments. Data lifecycle management is the process of managing business information throughout its lifecycle, from requirements through retirement. Data lifecycle management spans different application systems, databases and storage media and can be implemented as part of an overall information integration and governance strategy. By managing data properly over its lifetime, using database services, organizations can be better equipped support business goals with less risk.

It is further known that such computerized database services may require pre-payment for the services from the customer (generally a business, often a large business) to the database service provider. It is further known that such pre-payment can be based upon pre-paid "tokens" (also herein sometimes called RVUs) where each token represent a unit of pre-payment for some type of service or aspect of the database service. For example, it is known that a token may represent a pre-paid volume of data flow, with the data flow being measured at the time the data flows from the computer system of the business customer to the computer system of the database services provider. Herein, this sort of pre-payment plan will be called a pre-payment plan based upon "volumetric data flow." It is further known that a pre-payment plan may be more specifically based upon uncompressed volumetric data flow.

SUMMARY

According to an aspect of the present invention, there is a method for managing data services provided by a data services providing entity to a data services customer. The method includes the following steps (not necessarily in the following order): (i) establishing an at least substantially pre-paid account for data services to be provided by the data services providing entity to the data services customer, with a pre-payment being represented by relative value units (RVUs); (ii) decrementing at least one decremented RVU from the pre-paid account responsive to use made of the database services; (iii) receiving a request, from the data services customer, for a return of a current value of the at least one decremented RVU; and (iv) returning the current value of the at least one decremented RVU. At least the receiving step and the returning step are performed automatically under the control of software provided by the data services providing entity and substantially without human intervention.

BRIEF DESCRIPTION OF THE SEVERAL VIEWS OF THE DRAWINGS

FIG. 3B is a schematic view of a portion of the first embodiment computer system;

FIG. 4 is a flowchart showing a process according to the present invention;

FIG. 6A is a third screenshot generated by a second embodiment computer system;

FIG. 6B is a fourth screenshot generated by a second embodiment computer system; and FIG. 6C is a fifth screenshot generated by a second embodiment computer system.

DETAILED DESCRIPTION

Figure 1:
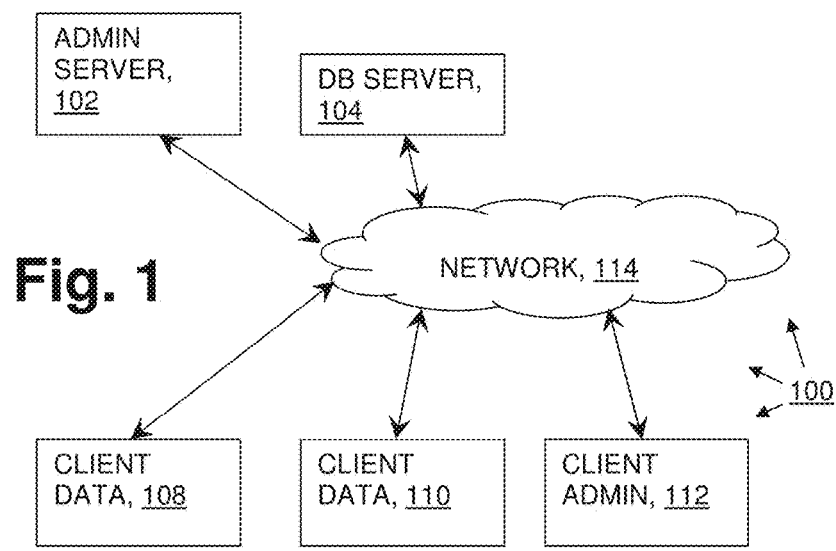
FIG. 1 is a schematic view of a first embodiment of a computer system according to the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIGS. 1, 2A, 2B, 3A and 3B, taken collectively, are a functional block diagram illustrating various portions of distributed data processing system 100, including: data services provider entity administration server sub-system 102; data services provider entity database server sub-system 104; first client (or customer) sub-system 108; second client (or customer) sub-system 110; client (or customer) administration sub-system 112; communications network 114; data services provider entity administration computer 200; data services provider entity database server computer 250; communication units 202, 252; processor set 204, 254; input/output (I/O) interfaces 206, 256; memory devices 208, 258; persistent storage devices 210, 260; display devices 212, 262; external device sets 214, 264; random access memory (RAM) devices 230, 270; cache memory devices 232, 272; database service modules (or mods) 240, 280; pre-pay sub-mod 302; usage sub-mod 304; limit sub-mod 310; correction sub-mod 312; test data management bucket 304*a*; data growth bucket 304*b*; application retirement bucket 304*c*; data privacy (sometimes also referred to as data masking) bucket 304*d*; caution sub-sub-mod 320; throttle sub-sub-mod 322; suspension sub-sub-mod 324; fact determining sub-sub-mod 330; policy sub-sub-mod 332; relative value unit return sub-sub-mod 334; database control sub-mod 352; resource usage sub-mod 360; populate data flow sub-sub-mod 370; delete sub-sub-mod 380; special charges sub-sub-mod 382; access data flow sub-sub-mod 372; storage used sub-sub-mod 374; and processing time sub-sub-mod 376.

In the following paragraphs, various components of admin server computer sub-system will be discussed. It will be understood by those of skill in the art that much of this discussion will also apply to corresponding components of db server sub-system 104; client data sub-systems 108, 110; and/or client admin sub-system 112.

Figure 2A:
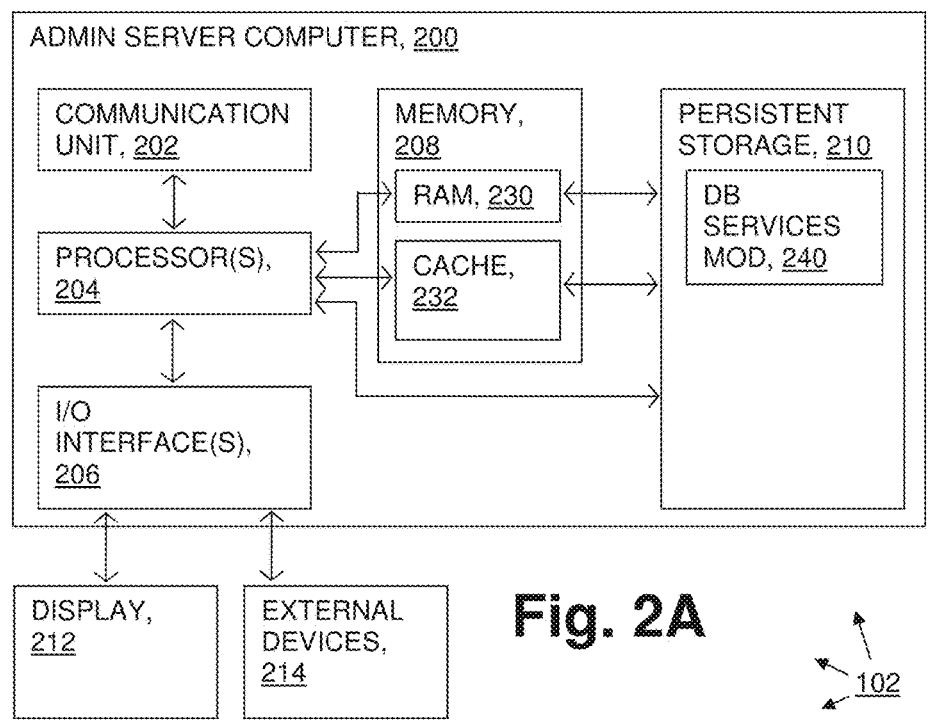
FIG. 2A is a schematic view of a portion of the first embodiment computer system.
Figure 2B:
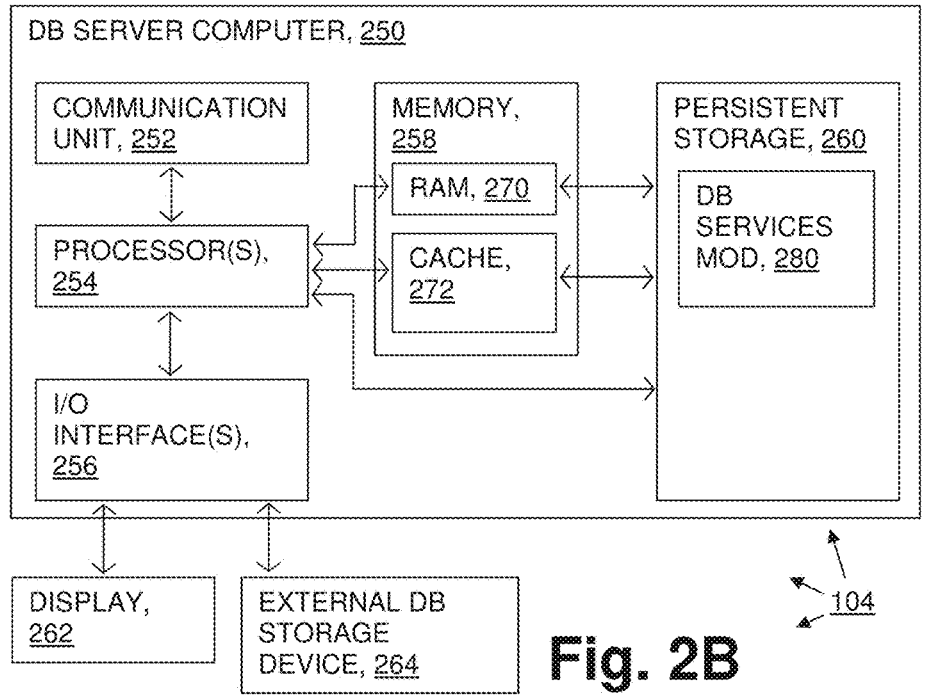
FIG. 2B is a schematic view of a portion of the first embodiment computer system.

Server computer sub-system 102 may include as a primary component 200 a laptop computer, tablet computer, netbook computer, personal computer (PC), a desktop computer, a personal digital assistant (PDA), a smart phone, or any programmable electronic device capable of communicating with the client sub-systems via network 114. As shown in FIG. 2A, db services module 240 is a collection of machine readable instructions and data that is used to (at least partially) create, manage and control the database services dealt with in the present invention.

Network 114 (see FIG. 1) can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIGS. 1, 2A, 2B, 3A, and 3B, taken together, provide only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

Turning again to FIG. 2A, server computer sub-system 102 is shown as a block diagram with many double arrows. These double arrows (no separate reference numerals) represent a communications fabric, which provides communications between various components of sub-system 102 as shown in FIG. 2A. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory sub-system 102.

DB services module (or, simply, mod) 240 is stored in persistent storage 210 for access and/or execution by one or more of the respective computer processors 204, usually through one or more memories of memory 208. Persistent storage 210 is at least more persistent than a signal in transit is, but the persistent storage may, of course, be substantially less persistent than permanent storage. Mod 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communication unit 202, in these examples, provides for communications with other data processing systems or devices external to sub-system 102, such as client sub-systems 104, 106, 108, 110, 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface(s) 206 allows for input and output of data with other devices that may be connected locally in data communication with server computer 250. For example, I/O interface 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, commerce module 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Figure 3A:
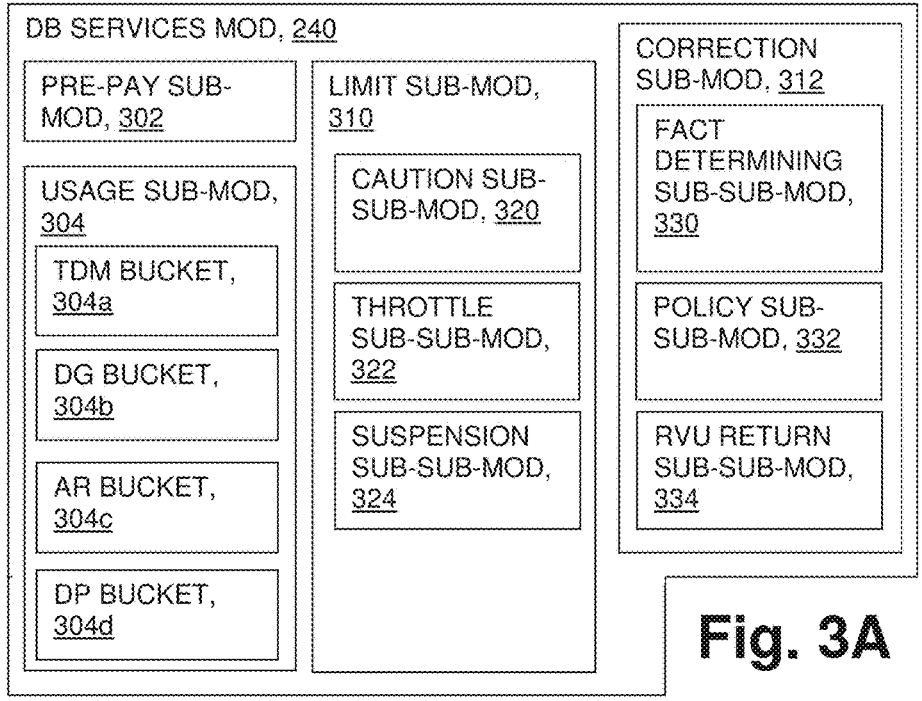
FIG. 3A is a schematic view of a portion of the first embodiment computer system.

Turning briefly to FIGS. 3A and 3B, the various modules, sub-modules and/or sub-sub-modules of FIGS. 3A and 3B will be woven into the discussion below of the flow chart of FIG. 4.

Turning now to FIG. 4, FIG. 4 is a flowchart depicting process 400 in accordance with an embodiment of the present invention. In this example, a database services portfolio adopts a pay-as-you-go model that uses relative value units (RVUs) as a mechanism (not necessarily the exclusive mechanism) by which customers pay for database services. A scheme for assessing RVUs from customer RVU account(s) is used to effectively measure and monitor the customers consumption of various types of database-service-related resources, and to thereby ensure appropriate pre-payment has been made for the usage of those database-services-related resources. With the method and system of the present invention: (i) consumption can be tracked through reports and internal auditing (these may be implemented as proprietary features of the database services system); and (ii) capacity usage can be tracked and reported upon. The various steps of process 400a will now be discussed in turn.

Processing begins at step S401, where a customer makes a pre-payment for database services with respect to one, or more, "RVU buckets." More specifically, pre-pay sub-mod 302 of db services mod 240 of admin server computer sub-system 102 (see FIGS. 2A and 3A) controls the receipt of this pre-payment from the services customer. This payment may be made with money, although other sorts of payment (for example, services barter) may be possible. This payment may be made, for example, through the internet. This payment may be handled automatically by software, or it may be accepted by a human agent of the services provider with assistance from pre-pay sub-mod 302.

Processing proceeds to step S402, wherein pre-pay sub-mod 302 credits the customers account with RVUs corresponding to the pre-payment. In some embodiments, there is only one type of RVU which is applied against all charged-for types of resource usage, but other embodiments may have multiple types of RVUs for different: (i) solutions (for example, test data management, data growth, application retirement, data privacy, etc.); (ii) types of usable resources; (iii) countries/regions/time zones/etc.; (iv) associated priorities or service levels agreement levels; (v) RVU expiration dates (if any); (vi) cost centers in the services customer's business; (vii) for databases with different sources, faster/slower; and/or (viii) other RVU and/or customer and/or data characteristics that may be varied. For a given customer account, each different type of RVU will have its own "bucket" (or sub-account).

Once the pre-pay sub-mod adds the RVUs to the various buckets of the customer's account, usage sub-mod 304 (see FIG. 3A) will use the purchased RVUs in the various buckets as a starting point for tracking pre-paid usage of database-service-related resources. As best shown at reference numerals 304a to 304d in FIG. 3A, in this example, there are four different types of RVUs respectively corresponding to four different solutions: (i) test data management (TDM), (ii) data growth (DG), (iii) application retirement (AR), and (iv) data privacy (DP).

In this embodiment, through the use of the RVU, the customer purchases a certain amount of capacity pertinent to the database services solution being used. In this embodiment, the RVU is applied to the product on a per repository basis, but, in other embodiments, RVUs may be designed to be transferrable across multiple repositories. To briefly explain the concept of a repository, in the Optim product and/or service, the repositories are referred to as "Optim Directories." In this document, the terms "repository" and "directory" will be used interchangeably, but it should be kept in mind that, when specifically dealing with the Optim product and/or service, the correct name is "Optim Directory." As will be explained below, a bucket will be decremented for each use of a resource (for example, each database-service-related execution) that the system designer has chosen to measure and to charge for. As will be explained below, internal records are cut, and stored in the databases services system repository, to track usage and to update remaining capacity on a substantially continuous basis. As will be explained below, once purchased capacity gets close to being exhausted, and/or is completely exhausted, then the system will respond to these conditions in a way chosen by the system designer.

In this example, each of the four database services solutions will have its own respective consumption tracking and reporting. In other words, in this example, four different RVU types and associated buckets are respectively dedicated to the following four solutions: test data management (TDM), data growth (DG), application retirement (AR), and data privacy (DP). As shown in FIG. 3A, usage sub-mod 304 includes: TDM RVU bucket 304a, DG RVU bucket 304b, AR RVU bucket 304c, and DP RVU bucket 304d. In other embodiments, all of these different solutions might be assigned a common RVU bucket. In still other embodiments, and as stated above, the RVU types may be defined differently, such as distinct RVU buckets and types for different types of resource usage, for different customer cost centers, etc.

The four solutions (TDM, DG, AR, DP) will now be briefly discussed.

DG relates to the total of all valid archive files (uncompressed) generated for data growth purposes.

AR relates to the total of all valid archive files (uncompressed) generated for application retirement purposes.

TDM relates to a maximum amount of uncompressed raw data pulled from the data sources (DDL excluded). The process will preferably include tracking the HWM ("high water mark") per table so as to avoid duplicating charges until a previously established HWM for a given table is exceeded. Detailed reporting will preferably track extract-style usage, as well as table-style usage.

DP (sometimes also called Data Masking, or DM) relates to a maximum amount of data masked via calls to the database service entity's associated "privacy providers."

The process will preferably include tracking the HWM per table so as not to duplicate charges until a previously established HWM for a given table is exceeded. Detailed reporting will preferably track the following: (i) insert usage; (ii) load usage; (iii) convert usage; and (iv) table usage.

Returning attention to FIG. 4, at step S403 the customer uses database services provided by the database service system and method of the present invention supplied by the database services supplier entity. For example, the customer may operate client admin computer sub-system 112 so that client data may be moved from client data sub-systems 108, 110 through network 114 to a data archive stored at external db storage device 264 of db server computer sub-system 104 (see FIGS. 1 and 2B) under direct control of db control sub-mod 352 of db services mod 280 (see FIG. 3B).

This use of the database services system will require the use of several different types of resources including: (i) a volume of uncompressed client data will flow through the database service provider's machines; (ii) processing time of the database services hardware; and (iii) data storage space (for example, space in device 264). In this example, resource usage sub-mod 260 of db service module 280 keeps track of these usages as they are performed at db server computer sub-system 104. More specifically: (i) the volume of uncompressed data that flows from the data source to the data destination is tracked by population data flow sub-sub-mod 370 of resource usage sub-mod 260 of db services mod 280; (ii) the processing time associated with this usage is tracked by processing time sub-sub-mod 376 of resource usage sub-mod 260 of db services mod 280; and (iii) the storage space required is tracked by storage used sub-sub-mod 374 of resource usage sub-mod 260 of db services mod 280. While not relevant to this archive population example operation, other usage types that can be tracked in this embodiment include: (i) data flow during a data accessing operation by the customer (see sub-sub-mod 372 in FIG. 3B); (ii) data deletion (see sub-sub-mod 380); and (iii) special charges (for example, expert assistance provided by the database service provider, see sub-sub-mod 382).

Returning attention to FIG. 4, processing proceeds to step S404, where the appropriate RVU bucket(s) are assessed RVUs based on usage. In this embodiment, the system designer has chosen only to charge the customer based upon uncompressed volumetric data flow (as tracked by sub-sub-mod 370). That is, there is no charge for processing time or storage device capacity used in this particular example. Accordingly: (i) resource usage sub-mod 360 of db server computer sub-system 104 informs usage sub-mod 304 of admin computer sub-system 102 about the amount of data flow that has occurred at the customer's command back at step S403; and (ii) usage sub-mod 304 assesses the appropriate RVU bucket 304a,b,c,d an appropriate number of RVUs corresponding to the volumetric data flow that the client has caused to occur. In this example, there is a simple proportional relationship between the quantity of data that flows and the quantity of RVUs decremented from appropriate RVU bucket. In other embodiments, there may be more complex relationships between the amount of usage (for example, amount of uncompressed volumetric data flow) and the amount of decrementing of the appropriate RVU bucket(s). In some embodiments, a single usage may cause more than one different RVU bucket to decrement depending upon how the different RVU types are defined in the commercial model used by the system designer.

In this example and as stated above, the RVU buckets respectively correspond to the various solutions provided by the database services provider. A given RVU bucket in the customer's account will be decremented when usage under the corresponding solution occurs. For example, an archive extracting 20 gigabytes (GB) would decrement 20,000,000,000 RVUs from the data growth RVU bucket 304b (see FIG. 3A), thereby taking the DG RVU bucket 304b from 100,000,000,000 RVUs down to 80,000,000,000 RVUs. (In this example, each byte of uncompressed volumetric data transfer is valued at 1 RVU.)

As will be explained below in more detail, once a given RVU bucket 304a, 304b, 304c or 304d is depleted, the customer will arrange to purchase more RVUs for the depleted bucket. This may be done, for example, through a sales representative of the database services provider entity.

Returning attention to FIG. 4, at step S405 the customer makes some kind of incorrect usage of the resource(s) of the database service system. In this example, the customer sends the same data to be archived, by the data growth (DG) solution of the database services system, twice in relatively quick succession, due to a miscommunication between employees at the business customer end. This incorrect data transfer amounts to 1 GB of uncompressed data, transferred twice, for a total of 2 GB of uncompressed volumetric data transfer.

Processing proceeds to step S406 where DG RVU bucket 304b is decremented based upon the incorrect usage of previous step S405. In this example, this means that 2,000,000,000 RVUs are decremented from bucket 304b for the uncompressed data flow associated with this DG solution operation that the business customer has performed twice (once correctly, and once duplicatively and erroneously).

Processing proceeds to step S407 where: (i) the customer realizes that an error was made at previous step S405; and (ii) uses the database services system of the present invention to perform a correction operation, which will be discussed in some detail below. It should be understood that this correction operation does not require any human service personnel from the database services entity to become involved. Rather, the correction operation to be described is handled automatically at the database service provider entity's end through software. This allows customers to make corrections quickly and reliably, and prevents stressful and time-inefficient communications that otherwise might be needed in a system where corrections are made by database service personnel, rather than automatically by software. Also, handling corrective adjustments automatically by software allows the correction policies to be made more uniform and without the possibility of partiality that may come into play when human service representatives are required to get involved in the correction process.

Figure 5A:
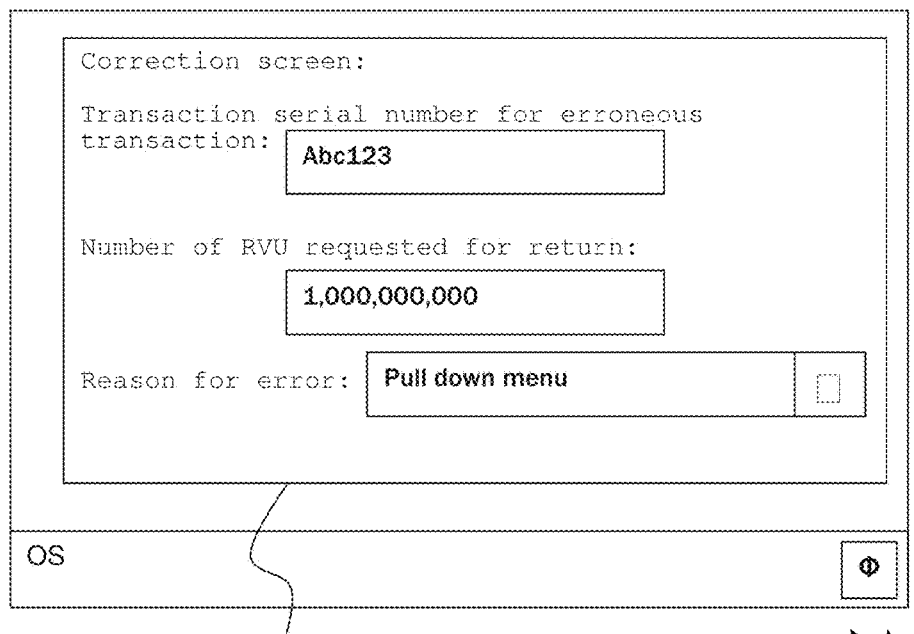
FIG. 5A is a first screenshot generated by the first embodiment computer system.

More specifically, at step S407, the customer, using client admin computer sub-system 112 (see FIG. 1), invokes correction sub-mod 312 of db services mod 240 of admin server computer sub-system 102 (see FIGS. 1, 2A and 3A) in order to get back the RVUs erroneously expended and decremented at steps S405 and S406. FIG. 5A shows screenshot 500a including correction request window 502, which is an example of the type of user interface that can be used by the business customer when requesting the software of the present invention to make a return of erroneously expended RVUs. In this example, the second, and redundant, archiving operation (of 1 GB of uncompressed data) is the erroneous transaction, so the customer is requesting that all 1,000,000,000 RVUs associated with this redundant transaction be returned. In this example, the customer is being asked a reason for the error. While this information may not be required to be provided in all embodiments of the present invention, it can be helpful in determining: (i) whether the software of the present invention will provide an automatic refund of RVUs; and/or (ii) information for future auditors (human and/or artificial intelligence based) who may review this refund transaction at a later time.

Processing proceeds to step S408 where: (i) fact determining sub-sub-mod 330 and policy sub-sub-mod 332 of correction sub-mod 312 of db service mod 240 (see FIG. 3A) determine whether a refund will be made; (ii) RVU return sub-sub-mod 334 of correction sub-mod 312 of db service mod 240 (see FIG. 3A) makes the automatic return of RVUs to the appropriate RVU bucket; and (iii) RVU return sub-sub-mod 334 notifies the customer that the return has been made. This is an example of the automatic, software-based correction of the present invention.

Fact determining sub-sub-mod 330 determines whether the customer's request for return is factually correct. For example: (i) is the transaction number valid?; (ii) did the specified transaction really expend the amount of RVUs that the customer believes it did; and/or (iii) other factual underpinnings of the refund request. If the customer's request is not factually correct, then the customer may be given an opportunity to make correction(s). In some cases, it may be that the refund request is simply mistaken, and the RVUs that the customer is concerned about were not really decremented from the customer account at all. Preferably, the software can effectively and automatically communicate with the customer about these kinds of contingencies.

Policy sub-sub-mod 332 determines whether the policies of the database service provider allow a refund under the circumstances of the request. For example, there may be a policy against honoring requests for returned RVUs where the RVUs were expended more than a year before the correction request was made. Many other policies for automatic, software-based refunds could be implemented by system designers of ordinary skill Policy sub-sub-mod 332 further determines the amount of the returned RVUs. For example, a database services provider entity may charge a 15% "restocking" fee to be discounted from the returned RVUs. In the present example of FIG. 3A and FIG. 4, the database services provider has a policy of honoring all factually-grounded refund requests in full, which means that, in this example, the business customer gets its entire 1,000,000,000 RVUs back corresponding to the uncompressed volumetric second, redundant, erroneous archive operation. Even in this case, the transaction may be audited by a human auditor at some later point in time, which audit potentially could lead to a further RVU increment or further decrement at some point in the future.

Figure 5B:
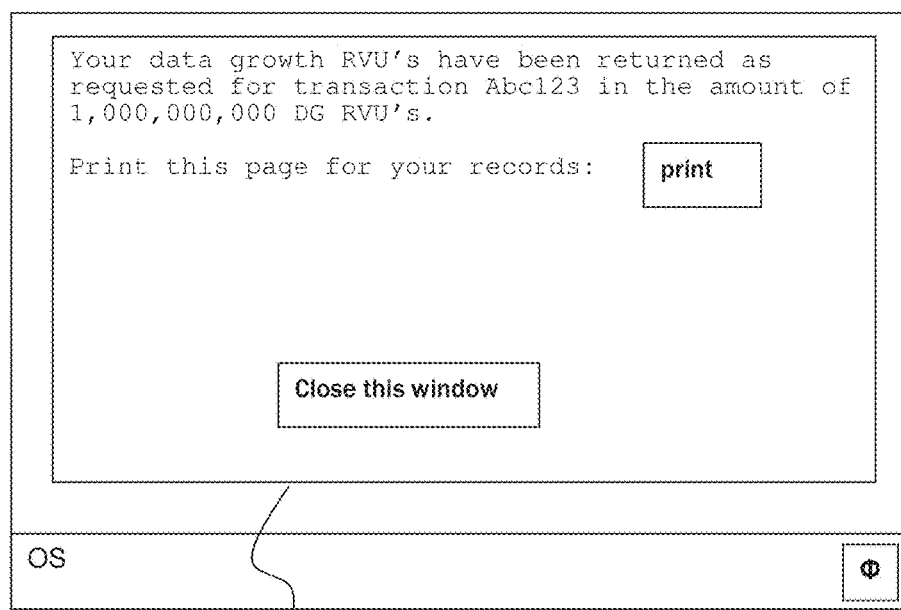
FIG. 5B is a second screenshot generated by the first embodiment computer system.

Also at step S408, the customer is presented with screenshot 500b of FIG. 5B. Screenshot 500b includes correction confirmation window 525, which is an example of the type of user interface that can be used to notify a customer that the return of erroneously expended RVUs has been accomplished.

Processing proceeds to step S409 where: (i) usage of the types shown in steps S403, S404, S405, S406, S407 and S408 continues according to the ebb and flow of the customers database activities; and (ii) the depletion of RVU bucket(s) is handled in some manner by limit sub-mod 310 (see FIG. 3A) as will now be explained in the following paragraphs.

There are various ways to handle the depletion of an RVU bucket according to the present invention. One way is to provide the business customer with "cautions" that a given RVU bucket is at, or near, depletion. Eventually, the business customer will make additional payments and processing will loop back to step S401. The "cautions" may take various forms, such as emails, pop-up windows, telephone calls and the like. In the example of FIG. 3A, the giving of these cautions is handled by caution sub-sub-mod 322 of limit sub-mod 310. In some preferred embodiments of the present invention, these "cautions" are the only form of limiting database services that take place. In these preferred embodiments, customers are effectively extended credit when they keep on performing database services operations (that is operations that are charged-for) after the associated RVU bucket(s) has been completely depleted. In these embodiments, the customer can be trusted to make a payment in due course and get its account "back in the black."

As shown in FIG. 3A, limit sub-mod 310 further includes throttle sub-sub-mod 322, which can be used to slow down, or otherwise make less user friendly, the performance of database services if a customer's RVU bucket gets near, at or past full depletion at step S409. This throttling can help incentivize a customer to make another pre-payment to re-up so that processing proceeds back to step S401. Not all embodiments of the present invention would include any sort of throttling.

As shown in FIG. 3A, limit sub-mod 310 further includes suspension sub-sub-mod 324, which can be used to suspend the performance of database services if a customer's RVU bucket gets to or past full depletion at step S409. This suspension can help incentivize a customer to make another pre-payment to re-up so that processing proceeds back to step S401. Not all embodiments of the present invention would include any sort of suspension.

The flowchart and block diagrams in the foregoing Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Some additional comments regarding the present invention will now be made in the following paragraphs. These paragraphs relate to an embodiment of the present invention as applied to an IBM database services program and/or package called "Optim" (note: the name Optim may be subject to trademark and/or service mark rights in some jurisdictions throughout the world). Specific features described in the following paragraphs should, of course, not be used to limit the scope of the present invention except to the extent that such a feature is required by explicit language of an issued claim. In the following example, the RVU that is used is a "token."

Because processes or services are sometime run in error (misunderstanding or unintended results), the ability for the customer to return consumption back to the Optim tracking mechanism is provided. Each process that consumes capacity will return a token which can be used in a subsequent process to return unintended consumption. This is described in more details in following sections of this document. Optim will not track, report, or indicate any capacity type messaging until an Optim Capacity Token Record (CTR) has been created within the Optim Directory. Optim will continue to function in the classic Processor Value Unit (PVU) model until a CTR have been detected during runtime. Once a CTR is created, Optim will then track consumption within the CTR. This method will support the migration from classic licensing (PVU) to capacity licensing (RVU) over time. The RVU or consumption model goes into effect the moment a CTR is applied. Repositories with no CTRs for a given solution will continue to be based on the PVU model.

Applying a Capacity Token to the Optim Directory will now be discussed. A capacity token is unique and may be applied to one and only one Optim Directory. Sites that use more than one directory will need to purchase capacity for each directory in use. During the process of applying the capacity token, Optim will create a new capacity token record (CTR) in the Optim Directory. Existing CTRs in the Optim Directory are not combined. Each capacity token has a single CTR managing the token during its lifecycle. Two or more CTRs can exist at the same time for a single solution. It is the total of all solution-based CTRs that will yield the total site capacity for that particular solution. Adding a CTR is only one aspect of dealing with capacity and consumption. Other supporting functions like the ability to Update, Delete and Return capacity are also supported.

Updating the Capacity within an Optim Directory will now be discussed. There may be the need to update an existing CTR within a given Optim Directory to have less capacity. Outside of the normal Optim processes it is preferable to allow for the original token value to be decremented. The UPDATE operation requires the caller to supply the original capacity token used to generate the CTR, the Optim Directory to which the token was applied and the amount in which the available capacity should be decremented. The value supplied for decrementing will be in gigabytes.

Returning Capacity to an Optim Directory will now be discussed. There are times when a request is run inadvertently or with the wrong attributes. This run while producing a valid outcome (archive file, extract file, privatized data) is not the intended outcome. Nonetheless because the process is considered successful by Optim the consumption is noted in the CTR. Under these circumstances the user should be able to return the consumption used by the erroneous process back to the CTR. Each process will produce a unique RETURN token. This token is returned as part of the process report but is also persisted in CTR entries related to the request. The encoding for the RETURN token will include the capacity consumed by the operation. Therefore, when the RETURN token is used to return consumed capacity back to the CTR only the token itself need be supplied. The user must supply the RETURN token associated with the erroneous request execution. The user must also supply the Optim Directory in which the CTR holding the capacity resides. Having the ability to return capacity opens a door to product misuse. Therefore the process of returning consumption is audited and monitored via a report.

Deleting Capacity Token Records from an Optim Directory will now be discussed. The purpose of the DELETE function is to remove CTRs with no capacity once it has been determined there is no need to include for reporting purposes. While the DELETE action implies the record is being removed from the CAPACITY table, it is in fact being updated altering the record type associated with the record CTR from a CTR type of '01' to '999'. (See CTR row types described below.) The renumbering of the main CTR entry leaves a tracking mechanism in the directory for history but allows the report facility to focus on the most current state (if that is desired). The process of renumbering the main CTR is only part of the DELETE process. All sub-ordinate record types with the same CAPACITY token will physically be deleted from the CAPACITY table.

Capacity Management via Batch will now be discussed. If the user wishes to apply the capacity token via command line, the syntax below describes what is needed. Any call from a user interface will invoke this API behind the scenes:

```
< executable name> /CAPacity /FUNCtion= { ADD | DELETE |
RETURN | { UPDATE SIZE=### } }
    TOKEN= { token | % }
    DIRectory=repository name
```

A examples for command-line usage will be set forth in the following paragraphs along with some exemplary command line language.

Apply a capacity token for 100 GB of Data Growth to the OPTIM_PROD repository. Command line language for this:
<executable name>/CAP/FUNC=ADD TOKEN=0F0E0D0C DIR=OPTIM_PROD Return 10 GB of capacity for Data Growth to the OPTIM_PROD repository. Command line language for this:

```
<executable name> /CAP /FUNC=RETURN TOKEN=0F0E0D1C
DIR=OPTIM_PROD
```

Decrement the Data Growth capacity token OPTIM_PROD directory by 20 GB due to outside circumstances. Command line language for this:

```
<executable name> /CAP /FUNC=UPDATE
TOKEN=0F0E0D0C SIZE=20 DIR=OPTIM_PROD
```

An archive request performed for application retirement purposes completed successfully. However since the user did not turn on the Application Retirement option in the Archive request editor, the consumption was mistakenly subtracted from the Data Growth capacity token. To avoid RETURNing the capacity for Data Growth and rerunning the request with the Application Retirement option on, the use can simply use the UPDATE command below to perform both operations. (The user should still fix the editor for any subsequent runs). The operation below will move the CTR records related to the request associated with the return token to the application retirement CTR set (the return token is adjusted for the solution type). It will add consumption back to the Data Growth capacity CTR. Lastly the Application Retirement capacity CTR will be decremented accordingly. Command line language for the foregoing:

```
<executable name> /CAP /FUNC=UPDATE TOKEN=0F0E0D0C
RETURN_TOKEN=0F0E0D1C DIR=OPTIM_PROD
```

Remove a single depleted capacity token in the OPTIM_PROD repository, thus removing it from the produced consumption report. Command line language for this:

```
<executable name> /CAP /FUNC=DELETE TOKEN=0F0E0D0C
DIR=OPTIM_PROD
```

Remove all depleted capacity tokens in the OPTIM_PROD repository, thus removing them from the produced consumption report. Command line language for this:
<executable name>/CAP/FUNC=DELETE TOKEN=ALL DIR=OPTIM_PROD Consumption Tracking in Optim will now be discussed. Optim tracks consumption for those requests completing successfully. Upon successful completion the CTR will be appropriately decremented. The condition for success and approach to measuring consumption is described below for each consumption category. A standard informational message will appear in all Optim process reports indicating the following: (i) Capacity consumed for the execution; (ii) Capacity remaining (total of all CTRs of a given type)' and (iii) Return Token(s) for each capacity type consumed during the operation. A message similar to the one below should appear for each CTR type involved in the process (Data Growth, TDM, Data Privacy, etc.): "This request has consumed nn,nnn,nnn (M or G). There is NNN,NNN,NNN (M or G) remaining. Return Token: 010d0303." At no point will Optim stop operating should the consumption cause a CTR to go negative (for example, the site has consumed more than it licensed). Optim will continue to operate. If the remaining value is negative, Optim will produce the following warning message: "Please contact IBM XXXX at xxxxx to acquire an additional capacity token to increase your entitlement to use Optim for <capacity type>."

Data Growth Tracking and Application Retirement will now be discussed. Capacity for data growth and application retirement is measured in gigabytes of uncompressed data pulled out of the data source and is decremented after the successful execution of an Archive request resulting in a valid Archive file. The request must be free of errors however warnings and informational messages can be generated during the process. If the Delete portion of the Archive request fails, capacity is still decremented as the resulting Archive file is valid and consumption would have been measured during the archive process. After the archive process completes successfully a new CTR specific for the solution (data growth, application retirement) and archive request is created and added to the CAPACITY directory table. The record indicates the size of the uncompressed archive file in the USED CAPACITY column of the record. At the time the request CTR is added the capacity token CTR's available consumption is decremented from the solution capacity token (data growth, application retirement) to reflect the overall usage. While there are separate tokens for data growth and application retirement, the method of tracking is identical. Therefore the examples below specifically identify requests run for the purposes of solving data growth issues.

In this example, a pre-operation CTR has an applied capacity token for 100 GB of data growth. In this scenario the customers runs an Archive request which generates an archive file containing 20 GB of uncompressed data (file, may of course, be compressed after the consumption is measured.) This operation results in a request level CTR for the Archive indicating 20 GB of used capacity. As a result of this operation, the capacity token CTR's available capacity is decremented by 20 GB leaving a remainder of 80 GB.

If a single operation must use capacity from multiple CTRs then an Archive request CTR will be recorded for each token from which capacity was consumed. In some cases, an archive file will need to use capacity from multiple tokens. For example, a 150 GB archive file might use 100 GB of capacity from a previously purchased token, in addition to 50 GB from a token that has not yet been purchased. Until the new token is purchased the "available capacity" for the used-up, old token will show as −50 GB.

Test Data Management (TDM) Tracking will now be discussed. Capacity for TDM is measured in gigabytes of uncompressed data extracted from the data sources as a result of an Extract operation and is decremented after the successful execution of an Extract request resulting in a valid Extract file. The request must be free of errors; however, warnings and informational messages can be generated during the process. Tracking TDM consumption requires, in this example, Optim to maintain the following information: (i) Consumption/charge per Extract Request; (ii) Table usage per extract; (iii) HWM consumption per Table. TDM tracking is a bit more complex than that of Data Growth. For TDM, frequent creation or refreshing of data subsets is promoted, so it is preferably ensured that it is not cost prohibitive to do so. Therefore the initial capacity token purchased should reflect the amount of data the user intends to extract from the database overtime to meet testing requirements. Optim will record a HWM for each table from which data was extracted. Only when a subsequent extract requires additional amounts of data that exceed a previously established HWM will additional consumption be charged and a new table HWM recorded.

After an extract process completes successfully a request CTR for an extract request is created and added to the CAPACITY directory table. The record indicates the size of the uncompressed user data comprising the extract file. In addition to the request CTR, a sub-request CTR for each table participating in the extract will be recorded with the capacity consumed for the table. In addition a set of non-request specific table CTRs will be added to track the HWM for a given table. Only one table CTR is necessary per capacity token, therefore the entries are first searched for an existing table CTR. If an existing table CTR is found it is updated with the new high-water mark only if the current size exceeds the previous recorded value and only the delta size will be deducted when compensating for consumption. The site will only be charged when they exceed a previously established high water mark.

Consuming Capacity, in the context of TDM, will now be discussed. After the extract process completes successfully a new request CTR specific for an extract request is created and added to the CAPACITY directory table. The record indicates the size of extracted data in the USED_CAPACITY field of the record. After the request CTR is added, a sub-request table CTR is added for each table that participated in the Extract that accounted for data consumption (if no rows were extracted from a specific table a sub-request CTR should not be recorded). The sub-request table CTR will call out the USED_CAPACITY for a specific table. The purpose of recording sub-request table CTRs is to handle the RETURN of capacity related to a specific extract request which is discussed in the Returning Capacity paragraph(s) below. For each sub-request table CTR, a look-up is done for the table CTR at the capacity token level. If a table CTR is found, its current HWM is compared to that of the current usage defined in the sub-request table CTR. If the sub-request table CTR's used capacity is greater than the table CTR HWM, the HWM is replaced with new value. The delta between the new HWM and previous HWM is then used to calculate the value subtracted from the overall available capacity. At any given time the sum of all tables CTR HWM values must equate to overall used capacity.

Returning Capacity, in the context of TDM, will now be discussed with reference to the screenshots respectively shown in FIGS. 6A, 6B and 6C. If an extract was run in error or unintentionally, then the RETURN API can be invoked to return capacity. In addition to the recordings in the CTR records, an audit record indicating the RETURN operation was requested is generated. When returning capacity associated with an Extract request, the request CTR 300 (See FIGS. 6A to 6C) to which the RETURN request is made to update the record by adding the size to the Available capacity column and updating the Modified Date column. All sub-request table CTRs 302 (see FIGS. 6A to 6C) associated with the request CTR are removed. The next step in the RETURN process is to recompute the HWM values associated with all table CTRs 301 (see FIGS. 6A to 6C) for which a sub-request table CTRs 302 were removed. After all table CTRs are adjusted, the capacity token CTR 300 is adjusted to increment the "Avail Capacity" (if necessary). FIGS. 6A to 6C show a few examples of RETURN scenarios. More specifically, pre operation CTRs re shown in FIG. 6A.

In an Operation #1, a RETURN for EXTRACT3, which consumed 15 GB, is performed resulting in the set of CTRs shown in the screenshot of FIG. 6B. In this scenario, the request CTR 300 for Extract3 was updated to indicate 15 GB in the Avail capacity column (indicator of returned capacity). The modify user and date are also updated to reflect the user returning capacity. The request table CTRs 302 related to Extract3 are removed. The table CTRs 301 for the tables involved in EXTRACT3 (customers and orders) are adjusted to have the new HWM values. By scanning all remaining request table CTRs 302, the new HWM value for customers is 1 GB and the new HWM value for orders is 2 GB. The final step is to adjust the capacity token CTR 100 available capacity value to reflect the new set of table HWM values. In this case, a total consumption of 3 GB is indicated by combining all table CTR HWM values, therefore the AVAIL CAPACITY incremented to 197 GB. A gain of 12 GB is recognized by returning EXTRACT3's consumption.

An exemplary token return "Operation #2," shown in the screenshot of FIG. 6C, will now be discussed. A RETURN for EXTRACT2 which consumed 2.5 GB is performed resulting in the following set of CTRs. In this scenario, the request CTR (300) for EXTRACT2 was updated to indicate 2.5 GB in the Avail capacity column (indicator of returned capacity). The modify user and date are also updated to reflect the user returning capacity. The request table CTRs 302 related to EXTRACT2 are removed. The table CTRs 301 for the tables involved in EXTRACT2 (customers and orders) are adjusted to have the new HWM values. By scanning all remaining request table CTRs 302, the new HWM value for customers is 0.5 GB and the HWM value for orders remains unchanged (2 GB). The final step is to adjust the capacity token CTR (100) available capacity value to reflect the new set of table HWM values. In this case a total consumption of 2.5 GB is indicated by combining all table CTR HWM values, therefore the AVAIL CAPACITY is incremented to 197.5 GB. A gain of 0.5 GB is recognized by returning EXTRACT2's consumption. It is possible that returning capacity may result in no gain if HWM values are not decremented. In this case the return operation should return a message to the user.

Data Masking tracking, like TDM, is a bit more complex than that of Data Growth or Application Retirement. Since Data Masking is usually (but is not required to be) performed as part of TDM this process will promote frequent refreshing of data subsets so there is a need to ensure it is not cost prohibitive to do so. Therefore, the initial capacity token purchased from the data services providing entity (for example, IBM) should reflect the amount of data the user intends to mask overtime to meet privacy requirements. Optim will record a HWM for each table for which data is masked. Only when a subsequent request requires additional amounts of data masking that exceeds a previously established HWM will additional consumption be charged and a new table HWM recorded.

Data Masking tracking like TDM is a bit more complex than that of Data Growth or Application Retirement. Since Data Masking is usually (but not required) performed as part of TDM this process will promote frequent refreshing of data subsets so we must ensure it is not cost prohibitive to do so. Therefore, the initial capacity token purchased from the data services providing entity (for example, IBM) should reflect the amount of data the user intends to mask overtime to meet privacy requirements. Optim will record a HWM for each table for which data is masked. Only when a subsequent request requires additional amounts of data masking that exceeds a previously established HWM will additional consumption be charged and a new table HWM recorded.

After a process completes successfully a request CTR for the insert, load or convert (includes Extract with convert option) is created and added to the CAPACITY directory table. The record indicates the size of the user data masked and pushed to the data source (DB, file). In addition to the request CTR, a sub-request CTR for each table participating in the masking operations will be recorded with the capacity consumed for the table. In addition a set of non-request specific table CTRs will be added to track the HWM for a given table. Only one table CTR is necessary per capacity token, therefore the entries are first searched for an existing table CTR. If an existing table CTR is found it is updated with the new high-water mark only if the current size exceeds the previous recorded value and only the delta size will be deducted when compensating for consumption. The site will only be charged when they exceed a previously established high water mark. Data Masking (like Data Growth, Application Retirement and TDM) will support the notion of a RETURN token allowing capacity to be returned for those operations run in error.

Consuming Capacity, in the context of Data Masking, will now be discussed. After the request completes successfully a new request CTR specific for the request is created and added to the CAPACITY directory table. The record indicates the size of data in the tables participating in the masking operation in the USED_CAPACITY column of the record. After the request CTR is added, a sub-request table CTR is added for each table that participated in the operation accounted for data masking consumption (if no elements were masked from a specific table a sub-request CTR should not be recorded). The sub-request table CTR will call out the USED_CAPACITY for a specific table. The purpose of recording sub-request table CTRs is to handle the RETURN of capacity related to a specific request.

For each sub-request table CTR, a look-up is done for the table CTR at the capacity token level. If a table CTR is found, its current HWM is compared to that of the current usage defined in the sub-request table CTR. If the sub-request table CTR's used capacity is greater than the table CTR HWM, the HWM is replaced with new value. The delta between the new HWM and previous HWM is then used to calculate the value subtracted from the overall available capacity. At any given time the sum of all tables CTR HWM values must equate to overall used capacity. If a single operation must use capacity from multiple CTRs then a Data Masking request CTR will be recorded for each token from which capacity was consumed. The pattern for recording is the same as that described in the Data Growth and Test Data Management tracking sections of this document.

Returning Capacity, in the context of Data Masking, will now be discussed. If a request is run in error (or unintentionally) the RETURN API can be invoked to return capacity. In addition to the recordings in the CTR records, an audit record indicating the RETURN operation was requested is generated. When returning capacity associated with an Insert, Load or Convert request, the request CTR to which the RETURN is made is found by searching the directory for the matching return token. Once located the request CTR record is updated by adding the original consumed value to the Available capacity column of the record and updating the Modified Date column. All sub-request table CTRs associated with the request CTR are removed. The next step in the RETURN process is to re-compute the HWM values associated with all table CTRs for which a sub-request table CTRs was respectively removed. After all table CTRs are adjusted, the capacity token CTR is adjusted to increment the Avail Capacity (if necessary).

A Capacity Usage Summary Report will now be discussed. To support IBM and client auditing requirements Optim will support an "audit" report for capacity consumption. To support reporting requirements Optim will capture capacity tracking data regardless if the site has enabled auditing. The customer will have the option to generate reports related to capacity consumption. This document will focus on the Capacity consumption reports. Two forms of OOB reporting are supplied: summary and detailed. The content of each is described below.

The Capacity Usage Summary Report will now be discussed. A summary report will preferably contain the following information per Optim Directory operating under the RVU model: (i) Total of purchased capacity for all solutions; (ii) Total of remaining capacity for all solutions; and (iii) List of capacity token applied to the directory each calling out: (a) Purchased capacity, (b) Remaining capacity, (c) Token type (Data growth, Application Retirement, TDM, Data Masking), (d) Date token was applied, and (e) Return Capacity.

The Capacity Usage Detailed Report will now be discussed. A detailed report will contain the following information per Optim Directory operating under the RVU model: (i)Total of purchased capacity for all solutions; (ii) Total of remaining capacity for all solutions; (iii) List of capacity token applied to the directory each calling out: (a) Purchased capacity; (b) Remaining capacity, and (c) Token type (Data growth, Application Retirement, TDM, Data Masking), (d) Date token was applied, (e) Returned consumption; (iv) Capacity usage details (per token); and (v) Capacity solution details (per token). Detailed usage information is available for Data Masking and Test Data Management (table usage).

What is claimed is:

1. A method for improving the way computer(s) operate in a context of managing computerized data services provided by a data services providing entity to a data services customer, the method comprising:
establishing a pre-paid account for computerized data services to be provided by the data services providing entity to the data services customer, with a pre-payment being represented by relative value units (RVUs) and the pre-paid account including at least two buckets for assigning RVUs;

crediting a quantity of RVUs to the buckets of the pre-paid account in response to a set of purchase(s) of RVUs by the data services customer;

responsive to use of the computerized data services by the data services customer, decrementing at least one decremented RVU from at least one bucket of the pre-paid account so that a quantity of remaining RVUs in the at least one bucket of the pre-paid account falls below a threshold value;

responsive to the remaining RVUs falling below the threshold value, throttling down the computerized data services provided to the data services with respect to at least following: types of computerized data services available and/or speed of computerized data services available;

subsequent to the throttling back of the computerized data services, receiving a request, from the data services customer, for a refund of a current value of the at least one decremented RVU;

determining both a factual accuracy status of the refund request and a policy acceptability status of automatically honoring the refund request;

responsive to a determination that factual accuracy status and policy acceptability status are both appropriate for making a refund, refunding the current value of the at least one decremented RVU so that a quantity of remaining RVUs in the at least one bucket of the pre-paid account increases to or above the threshold value;

responsive to refunding the current value of the at least one decremented RVU, displaying a graphical user interface on at least one display device, where the graphical user interface includes information indicative of at least one of: a refund request, a refunded current value of at least one decremented RVU, or a transaction number; and responsive to the remaining RVUs increasing to or above the threshold value, throttling up the computerized data services provided to the data services customer so that the types of computerized data services available and the speed of computerized data services available return to a status that they had before the throttling down of the computerized data services;

wherein:

at least the receiving, determining, and refunding steps are performed automatically under the control of software running on a processor set of a computer and substantially without human intervention;

an RVU represents a unit of pre-payment for computerized data services which may, or may not, directly correspond to a commonly traded currency;

the at least one decremented RVU is decremented in exchange for at least one of the following types of database usage: a volume of uncompressed client data flowing through a database service provider's machines, processing time of database services hardware, and/or data storage space;

the determining both the factual accuracy status and the policy acceptability status includes determining validity of a transaction number and that the at least one decremented RVU indicated in the request from the data services customer matches a deduction of RVUs from the pre-paid account;

each bucket is assigned to a different type of computerized data service; and

RVUs are credited and decremented from each bucket based, at least in part, on which computerized data services the customer uses.

2. The method of claim 1 wherein refunding the current value of the at least one decremented RVU comprises:

tracking, for each data table having a high water mark (HWM) for table use of a particular type and corresponding to the use made of the computerized data services to which the refund request pertains, information about the HWM immediately following the use made of the computerized data services (HWM 1) as compared to the HWM immediately prior to the use made of the computerized data services (HWM 0);

summing, over the data tables corresponding to the use made of the computerized data services to which the refund request pertains and for those data tables for which HWM 1 is greater than HWM 0, the differences between HWM 1 and HWM 0; and restoring, for each data table corresponding to the use made of the computerized data services to which the refund request pertains and for which HWM 1 is greater than HWM 0, HWM 0 as the HWM of the data table.

3. The method of claim 2 wherein the table use type is data masking or test data management.

4. The method of claim 1 wherein:

the throttling down of computerized data services provided to the data services customer decreases the speed of computerized data services available; and the throttling down of computerized data services provided to the data services customer decreases the speed of computerized data services available.

5. The method of claim 1 wherein the prepaid account includes at least one bucket for assigning RVUs based, at least in part, on at least one of: (i) test data management; (ii) data growth; (iii) application retirement; (iv) data privacy; (v) types of usable resources; (vi) countries; (vii) regions; (viii) time zones; (ix) associated priorities or service levels agreement levels; (x) RVU expiration dates; (xi) cost centers in the data services customer's business; and (xii) for databases with different sources.

6. A system for improving the way computer(s) operate in a context of managing data services provided by a data services providing entity to a data services customer, the system comprising a customer account management computer sub-system comprising:

a processor set; and a software storage device;

wherein:

the processor set is structured, programmed and/or connected to run software stored in the software storage device;

the software storage device has stored thereon a data services module;

the data services module is programmed to:

establish a pre-paid account for computerized data services to be provided by the data services providing entity to the data services customer, with a pre-payment being represented by relative value units (RVUs) and the pre-paid account including at least two buckets for assigning RVUs, credit a quantity of RVUs to the buckets of the pre-paid account in response to a set of purchase(s) of RVUs by the data services customer, responsive to use of the computerized data services by the data services customer, decrementing at least one decremented RVU from at least one bucket of the pre-paid account so that a quantity of remaining RVUs in the at least one bucket of the pre-paid account falls below a threshold value responsive to use made of the computerized data services, responsive to the remaining RVUs falling below the threshold value, throttle down the computerized data services provided to the data services with respect to at least following: types of computerized data services available and/or speed of computerized data services available, subsequent to the throttling back of the computerized data services, receive a request, from the data services customer, for a refund of a current value of the at least one decremented RVU, determine both a factual accuracy status of the refund request, and a policy acceptability status of automatically honoring the refund request, responsive to a determination that the refund request is appropriate based, at least in part, on the determination of factual accuracy status and policy acceptability status are both appropriate for making a refund, refund the current value of the at least one decremented RVU so that a quantity of remaining RVUs in the at least one bucket of the pre-paid account increases to or above the threshold value, responsive to refunding the current value of the at least one decremented RVU, display a graphical user interface on at least one display device, where the graphical user interface includes information indicative of at least one of: a refund request, a refunded current value of at least one decremented RVU, or a transaction number, and responsive to the remaining RVUs increasing to or above the threshold value, throttle up the computerized data services provided to the data services customer so that the types of computerized data services available and the speed of computerized data services available return to a status that they had before the throttling down of the computerized data services;

an RVU represents a unit of pre-payment for computerized data services which may, or may not, directly correspond to a commonly traded currency;

the at least one decremented RVU is decremented in exchange for at least one of the following types of database usage: a volume of uncompressed client data flowing through a database service provider's machines, processing time of database services hardware, and/or data storage space;

the determining both the factual accuracy status and the policy acceptability status includes determining validity of a transaction number and that the at least one decremented RVU indicated in the request from the data services customer matches a deduction of RVUs from the pre-paid account;

each bucket is assigned a different type of computerized data service; and

RVUs are credited and decremented from each bucket based, at least in part, on which computerized data services the data services customer uses.

7. The system of claim 6 wherein refunding the current value of the at least one decremented RVU comprises:
tracking, for each data table having a high water mark (HWM) for table use of a particular type and corresponding to the use made of the computerized data services to which the refund request pertains, information about the HWM immediately following the use made of the computerized data services (HWM 1) as compared to the HWM immediately prior to the use made of the computerized data services (HWM 0);

summing, over the data tables corresponding to the use made of the computerized data services to which the refund request pertains and for those data tables for which HWM 1 is greater than HWM 0, the differences between HWM 1 and HWM 0; and restoring, for each data table corresponding to the use made of the computerized data services to which the refund request pertains and for which HWM 1 is greater than HWM 0, HWM 0 as the HWM of the data table.

8. The system of claim 7 wherein the table use type is data masking or test data management.

9. The product of claim 6 wherein the prepaid account includes at least one bucket for assigning RVUs based, at least in part, on at least one of: (i) test data management; (ii) data growth; (iii) application retirement; (iv) data privacy; (v) types of usable resources; (vi) countries; (vii) regions; (viii) time zones; (ix) associated priorities or service levels agreement levels; (x) RVU expiration dates; (xi) cost centers in the data services customer's business; and (xii) for databases with different sources.

10. A computer program product for improving the way computer(s) operate in a context of managing computerized data services provided by a data services providing entity to a data services customer, the computer program product comprising:

one or more non-transitory computer-readable storage media and program instructions stored on the one or more non-transitory computer-readable storage media, the program instructions comprising:

an establishing instruction set programmed to establish a pre-paid account for computerized data services to be provided by the data services providing entity to the data services customer, with a pre-payment being represented by relative value units (RVUs) and the pre-paid account including at least two buckets for assigning RVUs;

a plurality of instruction sets respectively programmed to:
credit a quantity of RVUs to the buckets of the pre-paid account in response to a set of purchase(s) of RVUs by the data services customer, responsive to use of the computerized data services by the data services customer, decrementing at least one decremented RVU from at least one bucket of the pre-paid account so that a quantity of remaining RVUs in the at least one bucket of the pre-paid account falls below a threshold value responsive to use made of the computerized data services, responsive to the remaining RVUs falling below the threshold value, throttle down the computerized data services provided to the data services with respect to at least following: types of computerized data services available and/or speed of computerized data services available, subsequent to the throttling back of the computerized data services, receive a request, from the data services customer, for a refund of a current value of the at least one decremented RVU, determine both a factual accuracy status of the refund request, and a policy acceptability status of automatically honoring the refund request, responsive to a determination that the refund request is appropriate based, at least in part, on the determination of factual accuracy status and policy acceptability status are both appropriate for making a refund, refund the current value of the at least one decremented RVU so that a quantity of remaining RVUs in the at least one bucket of the pre-paid account increases to or above the threshold value, responsive to refunding the current value of the at least one decremented RVU, display a graphical user interface on at least one display device, where the graphical user interface includes information indicative of at least one of: a refund request, a refunded current value of at least one decremented RVU, or a transaction number, and responsive to the remaining RVUs increasing to or above the threshold value, throttle up the computerized data services provided to the data services customer so that the types of computerized data services available and the speed of computerized data services available return to a status that they had before the throttling down of the computerized data services;

wherein:

an RVU represents a unit of pre-payment for computerized data services which may, or may not, directly correspond to a commonly traded currency;

the at least one decremented RVU is decremented in exchange for at least one of the following types of database usage: a volume of uncompressed client data flowing through a database service provider's machines, processing time of database services hardware, and/or data storage space; and the determining both the factual accuracy status and the policy acceptability status includes determining validity of a transaction number and that the at least one decremented RVU indicated in the request from the data services customer matches a deduction of RVUs from the pre-paid account;

each bucket is assigned a different type of computerized data service; and

RVUs are credited and decremented from each bucket based, at least in part, on which computerized data services the data services customer uses.

11. The product of claim 10 wherein refunding the current value of the at least one decremented RVU comprises:

tracking, for each data table having a high water mark (HWM) for table use of a particular type and corresponding to the use made of the computerized data services to which the refund request pertains, information about the HWM immediately following the use made of the computerized data services (HWM 1) as compared to the HWM immediately prior to the use made of the computerized data services (HWM 0);

summing, over the data tables corresponding to the use made of the computerized data services to which the refund request pertains and for those data tables for which HWM 1 is greater than HWM 0, the differences between HWM 1 and HWM 0; and restoring, for each data table corresponding to the use made of the computerized data services to which the refund request pertains and for which HWM 1 is greater than HWM 0, HWM 0 as the HWM of the data table.

12. The product of claim 11 wherein the table use type is data masking or test data management.

13. The system of claim 10 wherein the prepaid account includes at least one bucket for assigning RVUs based, at least in part, on at least one of: (i) test data management; (ii) data growth; (iii) application retirement; (iv) data privacy; (v) types of usable resources; (vi) countries; (vii) regions; (viii) time zones; (ix) associated priorities or service levels agreement levels; (x) RVU expiration dates; (xi) cost centers in the data services customer's business; and (xii) for databases with different sources.

* * * * *